US010437569B2

(12) United States Patent
Bijani et al.

(10) Patent No.: US 10,437,569 B2
(45) Date of Patent: Oct. 8, 2019

(54) INTELLIGENT CLOUD ENGINEERING PLATFORM

(71) Applicant: Accenture Global Solutions Limited, Dublin (IE)

(72) Inventors: Pramodsing Bijani, Bandra (West) Mumbai (IN); Mahesh Bandkar, Mumbai (IN); Anand Parulkar, Mumbai (IN); Mufaddal Moazam Kantawala, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/836,100

(22) Filed: Dec. 8, 2017

(65) Prior Publication Data

US 2019/0026085 A1     Jan. 24, 2019

(30) Foreign Application Priority Data

Jul. 21, 2017   (IN) .............................. 201741026021

(51) Int. Cl.
| | |
|---|---|
| *G06F 9/44* | (2018.01) |
| *G06F 8/35* | (2018.01) |
| *G06F 8/10* | (2018.01) |
| *G06F 8/60* | (2018.01) |
| *G06N 20/00* | (2019.01) |
| *G06F 8/30* | (2018.01) |

(52) U.S. Cl.
CPC .................. *G06F 8/35* (2013.01); *G06F 8/10* (2013.01); *G06F 8/30* (2013.01); *G06F 8/60* (2013.01); *G06N 20/00* (2019.01)

(58) Field of Classification Search
CPC ....................................................... G06F 8/35
See application file for complete search history.

(56) References Cited

U.S. PATENT DOCUMENTS

2007/0276898 A1* 11/2007 Berkland ................ H04L 29/06
                                                                   709/201
2008/0209446 A1*  8/2008 Grechanik ............... G06F 8/20
                                                                   719/320

(Continued)

OTHER PUBLICATIONS

Levcovitz, A., et al., Towards a Technique for Extracting Microservices from Monolithic Enterprise Systems, 3rd Brazilian Workshop on Software Visualization, Evolution and Maintenance (VEM), 2015, https://arxiv.org/pdf/1605.03175.pdf, pp. 97-104.

(Continued)

*Primary Examiner* — Hang Pan
(74) *Attorney, Agent, or Firm* — Harrity & Harrity, LLP

(57) ABSTRACT

A device receives application information associated with a monolithic application, and generates a recommendation based on utilizing an artificial intelligence technique. The recommendation relates to a service to be generated, a service category for the service, and a deployment model for the service. The artificial intelligence technique generates the recommendation based on the application information. The device automatically generates code for the service based on the service category and the application information, receives a request to deploy the generated code for the service via the deployment model, and deploys the generated code, based on the request, to provide the service via the deployment model.

20 Claims, 10 Drawing Sheets

(56) References Cited

U.S. PATENT DOCUMENTS

| | | | |
|---|---|---|---|
| 2009/0037896 A1* | 2/2009 | Grechanik | G06F 8/65 |
| | | | 717/168 |
| 2010/0153444 A1* | 6/2010 | Nayak | G06Q 10/10 |
| | | | 707/770 |
| 2013/0007216 A1* | 1/2013 | Fries | G06F 9/4856 |
| | | | 709/218 |
| 2014/0089888 A1 | 3/2014 | Bhaskara et al. | |
| 2014/0122407 A1* | 5/2014 | Duan | G06N 5/02 |
| | | | 706/50 |
| 2017/0046146 A1 | 2/2017 | Jamjoom et al. | |
| 2017/0187785 A1 | 6/2017 | Johnson et al. | |

OTHER PUBLICATIONS

Kecskemeti, G., et al., The Entice Approach to Decompose Monolithic Services into Microservices, 2016 International Conference on High Performance Computing & Simulation (HPCS), http://eprints.sztaki.hu/8991/1/Kecskemeti_591_3171414_ny.pdf, Jul. 18-22, 2016.

Gabbrielli, M., et al., Self-Reconfiguring Microservices, Theory and Practice of Formal Methods, Lecture Notes in Computer Science, URL: https://hal.inria.fr/hal-01336688/document, 2016, vol. 9660, pp. 194-210.

Villamizar M. et al., "Evaluating the Monolithic and the Microservice Architecture Pattern to Deploy Web Applications in the Cloud," 10th Computing Colombian Conference (10CCC), Sep. 2015, pp. 583-590. [retrieved on Apr. 9, 2019], Retrieved from the Internet [URL: https://ieeexplore.ieee.org/abstract/document/7333476].

* cited by examiner

US 10,437,569 B2

INTELLIGENT CLOUD ENGINEERING PLATFORM

RELATED APPLICATION

This application claims priority under 35 U.S.C. § 119 to Indian Patent Application No. 201741026021, filed on Jul. 21, 2017, the content of which is incorporated by reference herein in its entirety.

BACKGROUND

Applications, such as enterprise applications, have traditionally been designed in a monolithic fashion. A monolithic application may include a single-tiered application in which the user interface and data access code are combined into a single program from a single platform. In some cases, a monolithic application may be responsible for not just a particular task, but for every task or step needed to complete a particular function. A monolithic application may be associated with a single device, such as a server or mainframe, which is self-contained and independent from other computing resources.

SUMMARY

In some implementations, a device may include one or more memories, and one or more processors, communicatively coupled to the one or more memories, to: receive application information associated with a monolithic application, and generate a recommendation based on utilizing an artificial intelligence technique. The recommendation may relate to a service to be generated, a service category for the service, and a deployment model for the service. The artificial intelligence technique may generate the recommendation based on the application information. The one or more processors may automatically generate code for the service based on the service category and the application information, receive a request to deploy the generated code for the service via the deployment model, and deploy the generated code, based on the request, to provide the service via the deployment model.

In some implementations, a non-transitory computer-readable medium may store instructions that include one or more instructions that, when executed by one or more processors, cause the one or more processors to receive application information associated with a monolithic application, and generate a recommendation based on utilizing an artificial intelligence technique. The recommendation may relate to a service to be generated, a service category for the service, and a deployment model for the service. The artificial intelligence technique may generate the recommendation based on the application information. The one or more instructions may further cause the one or more processors to automatically generate code for the service based on the service category and the application information, receive a request to deploy the generated code for the service via the deployment model, and deploy the generated code, based on the request, to provide the service via the deployment model.

In some implementations, a method may include receiving, by a device, application information associated with a monolithic application, and generating, by the device, a recommendation based on utilizing an artificial intelligence technique. The recommendation may relate to a service to be generated, a service category for the service, and a deployment model for the service. The artificial intelligence technique may generate the recommendation based on the application information. The method may further include automatically generating, by the device, code for the service based on the service category and the application information, receiving, by the device, a request to deploy the generated code for the service via the deployment model, and deploying, by the device and based on the request, the generated code to provide the service via the deployment model.

DETAILED DESCRIPTION

Figure 1A:
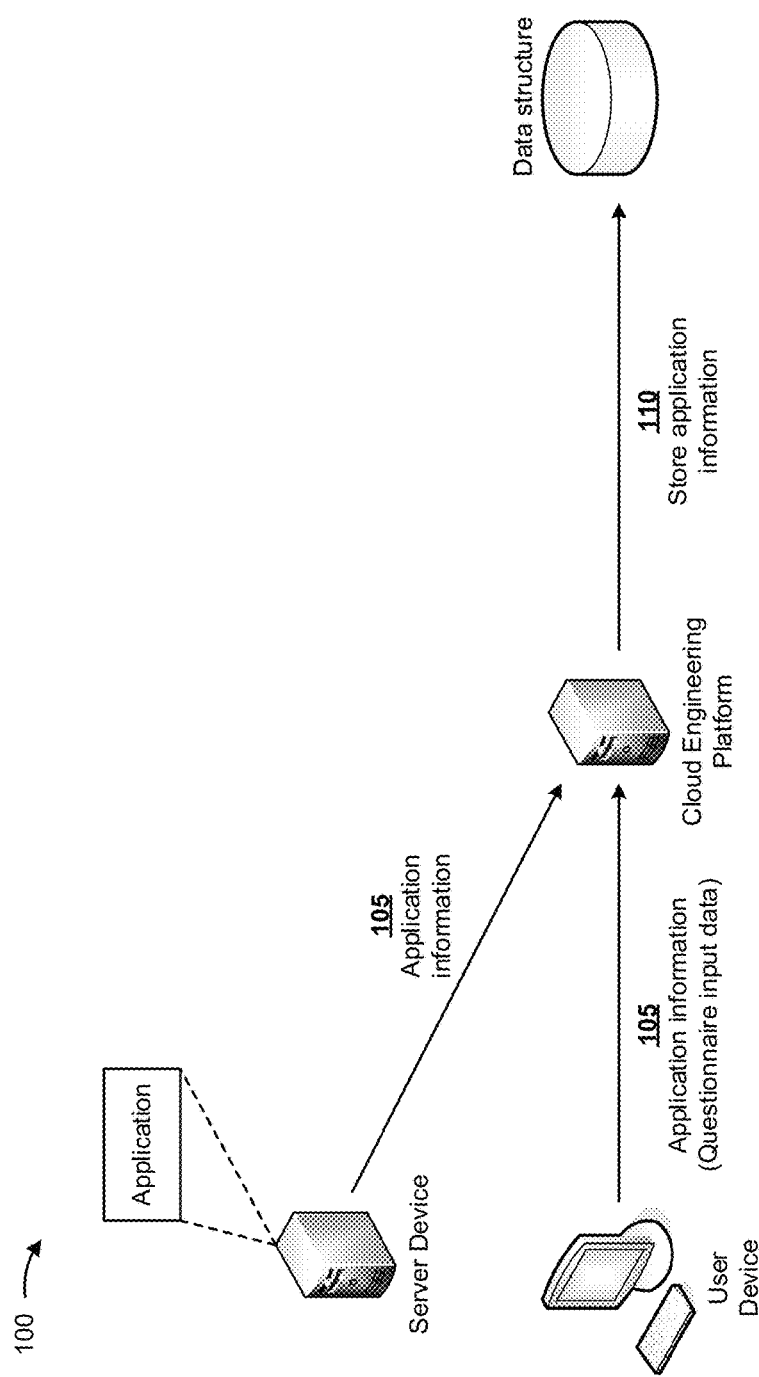
FIGS. 1A-1G are diagrams of an overview of an example implementation described herein.

The following detailed description of example implementations refers to the accompanying drawings. The same reference numbers in different drawings may identify the same or similar elements.

Cloud computing has seen increasing use for a variety of reasons, including cost savings, ease of maintenance, scalability, and versatility. Cloud computing provides a level of scalability and versatility for which a monolithic application is not well suited. For example, assume that a particular element of a monolithic application processes data at a particular rate. Since the monolithic application is a single program, the particular element may not be scalable when the data rate increases past the particular rate. This may lead to bottlenecking and other inefficiencies.

Many application providers are replacing monolithic applications with collections of services or microservices. A microservice is a suite of independently deployable, small, modular services (e.g., software applications) in which each service executes a unique process and communicates through a well-defined, lightweight mechanism to serve a business goal. Collections of services or microservices may provide scalability in a cloud environment, because if a particular service causes a bottleneck, the particular service may be duplicated or parallelized in the cloud environment. However, many difficulties arise when replacing an application with a collection of services. As an example, consider a business context, where a monolithic business application is being replaced with a collection of business services. In such a case, an application designer may need to identify business and technology imperatives that should be prioritized and may need to identify services, of the application, that need to be modernized or built from scratch to satisfy the business imperatives. Furthermore, the application designer may benefit from using application programming interfaces (APIs) that are predefined, highly available, and/or always available.

One challenge with the above is that entities that have information regarding business imperatives may be different from entities that have knowledge regarding technology imperatives, and both of these may be different from an application engineer that creates the business services. Therefore, the application engineer may lack full visibility of business and technology imperatives. Further, even if the application engineer has full visibility of business and technology imperatives, the application engineer may use a subjective, error-prone, or non-rigorous approach to prioritizing the business and technology imperatives. This may lead to development of a collection of business services that does not adequately address the business and technology imperatives. Furthermore, in some cases, an application engineer may not use a rigorous approach to selection of APIs. In such a case, identification of services that need to be modernized or built from scratch, creation of the services, and modernization of services may be inconsistent and inefficient. Furthermore, significant operational overhead may be involved with deploying these collections of services to a cloud environment.

Some implementations described herein provide a seamless and interactive way to identify and create future-ready services from traditional monolithic applications. For example, some implementations described herein may utilize artificial intelligence (AI) to identify a monolithic application amenable to being modernized (e.g., updated or built from scratch) through integration of services or microservices based on business imperatives and/or technology imperatives associated with the application and/or based on an entity associated with the application. Additionally, or alternatively, some implementations described herein may generate code for the services or microservices, and may deploy the generated code so that the monolithic application is implemented via the services or microservices.

FIGS. 1A-1G are diagrams of an overview of an example implementation 100 described herein. As shown in FIG. 1A, a user device and a server device may be associated with a cloud engineering platform. The server device may be associated with an application, such as a monolithic application. As shown in FIG. 1A, by reference number 105, the user device and the server device may provide application information to the cloud engineering platform. In some implementations, the application information may include information associated with the application. For example, the application information may include code of the application, information about technical parameters of the application, business parameters of the application, business imperatives and/or technology imperatives associated with the application, a software license agreement of the application, availability information associated with the application, operational needs of the application, and/or the like.

In some implementations, the application information may be provided in a particular format, such as a spreadsheet format that includes the application information, a spreadsheet-based questionnaire that includes the application information, and/or the like. In some implementations, the user device or the server device may provide the particular format to a user of the user device or the server device, and the user may provide the application information via the particular format. In some implementations, the cloud engineering platform may provide (e.g., for display) the particular format to the user device or the server device, and the user may provide the application information via the particular format. In some implementations, the cloud engineering platform may automatically retrieve the application information from the server device and/or from other devices (e.g., devices that provide information associated with business parameters, business needs, architectures capable of hosting the application, and/or the like).

As further shown in FIG. 1A, and by reference number 110, the cloud engineering platform may receive the application information, and may store the application information in a data structure, such as a database, a table, a linked-list, a tree, and/or the like. In some implementations, the data structure may be provided in a memory associated with the cloud engineering platform. The cloud engineering platform may store the application information so that the cloud engineering platform may perform further processing on the application information, such as determining services or microservices that may generated based on the application. In some implementations, the cloud engineering platform may provide security features, such as integration with vaults or secret data sources for secure distribution of confidential data across services and/or containers.

Figure 1B:
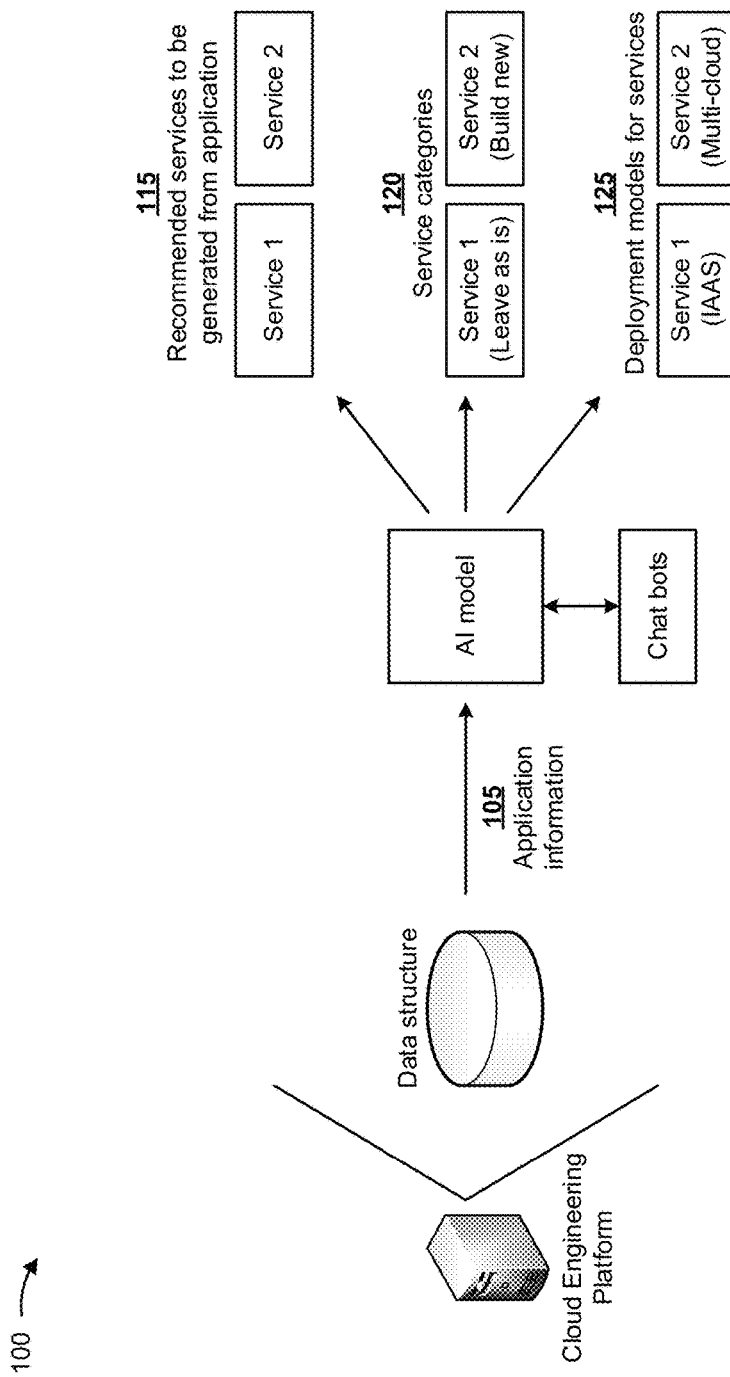

As shown in FIG. 1B, an artificial intelligence (AI) model, provided by the cloud engineering platform, may retrieve or receive the application information from the data structure, as indicated by reference number 105. In some implementations, the AI model may include a machine learning model, a naïve Bayes biased classifier model, a deep learning neural network model, a neural network model, a support vector machine model, and/or the like. In some implementations, the cloud engineering platform may process the application information using natural language processing. In this case, the AI model may include or be associated with a natural language processing application that recognizes, parses, and/or interprets the application information. Natural language processing is a field of computer science, artificial intelligence, and/or computational linguistics concerned with the interactions between computers and human (natural) languages and, in some cases, may be particularly concerned with programming computers to fruitfully process large natural language corpora.

As further shown in FIG. 1B, and by reference number 115, the AI model may identify recommended services (or microservices) to be generated from the application. For example, the AI model may determine that two services (e.g., Service 1 and Service 2) may be generated from the application. In some implementations, the AI model may identify new capabilities that could be delivered using the recommended services, may identify application programming interfaces (APIs) or types of APIs that could be serviced using the recommended services, may identify business imperatives that could be accelerated or improved using the recommended services, and/or the like.

As further shown in FIG. 1B, and by reference number 120, the AI model may identify a service category for each of the recommended services (or microservices). In some implementations, the service category may include a "leave as is" category (e.g., indicating that the application need not be altered to implement a recommended service), a "build new" category (e.g., indicating that the application may not provide a recommended service, and that the recommended service needs to be created), a "modernize" category (e.g., indicating that the application needs to be modernized in order to implement a recommended service), and/or the like. For example, the AI model may categorize Service 1 in the "leave as is" category, indicating that the application need not be altered to implement Service 1. The AI model may categorize Service 2 in the "build new" category, indicating that the application may not provide Service 2 and that Service 2 needs to be created.

As further shown in FIG. 1B, and by reference number 125, the AI model may identify a deployment model best suited for each of the recommended services (or microservices). In some implementations, the deployment model may include information as a service (IAAS) on a web service, IAAS on a cloud application platform, platform as a service (PAAS) on a cloud application platform, a multi-cloud platform deployment, and/or the like. For example, the AI model may determine that Service 1 is best suited to be deployed as IAAS on a web service, and that Service 2 is best suited to be deployed as a multi-cloud platform deployment.

In some implementations, the AI model may identify what applications need to be modernized (e.g., re-factored or re-engineered) into either services or microservices, based on a combination of technical viability and business impact. In some implementations, the AI model may determine what new capabilities could be delivered by creating new services or microservices. In some implementations, the AI model may determine what kind of APIs could be serviced by leveraging these new or modernized services. In some implementations, the AI model may determine what business imperatives could be accelerated by the new or modernized services. In some implementations, the AI model may provide analyses of how business imperatives are likely to benefit by recommendations.

As further shown in FIG. 1B, the AI model may interact with one or more chat bots (e.g., computer programs that conduct conversations via auditory or textual methods) when identifying the recommended services, the service categories, and/or the deployment models. In such implementations, the chat bots may provide mechanisms for user input to and interaction with the AI model. For example, the chat bots may guide the process from determining the recommended services, to determining the service categories for the recommended services, and to determining the deployment models for the recommended services. In some implementations, each chat bot may include an Artificial Intelligence Virtual Assistant (AIVA) chat bot, a JavaScript (JS) chat bot, a node JS (or Node.js, an open source JavaScript run-time environment) chat bot, a Hubot chat bot, and/or the like.

In some implementations, a user of the cloud engineering platform may be presented with information identifying the recommended services, the service categories, and the deployment models, and may select one or more of the recommended services, the service categories, and/or the deployment models for further processing. In some implementations, the cloud engineering platform may automatically select one or more of the recommended services, the service categories, and/or the deployment models for further processing.

Figure 1C:
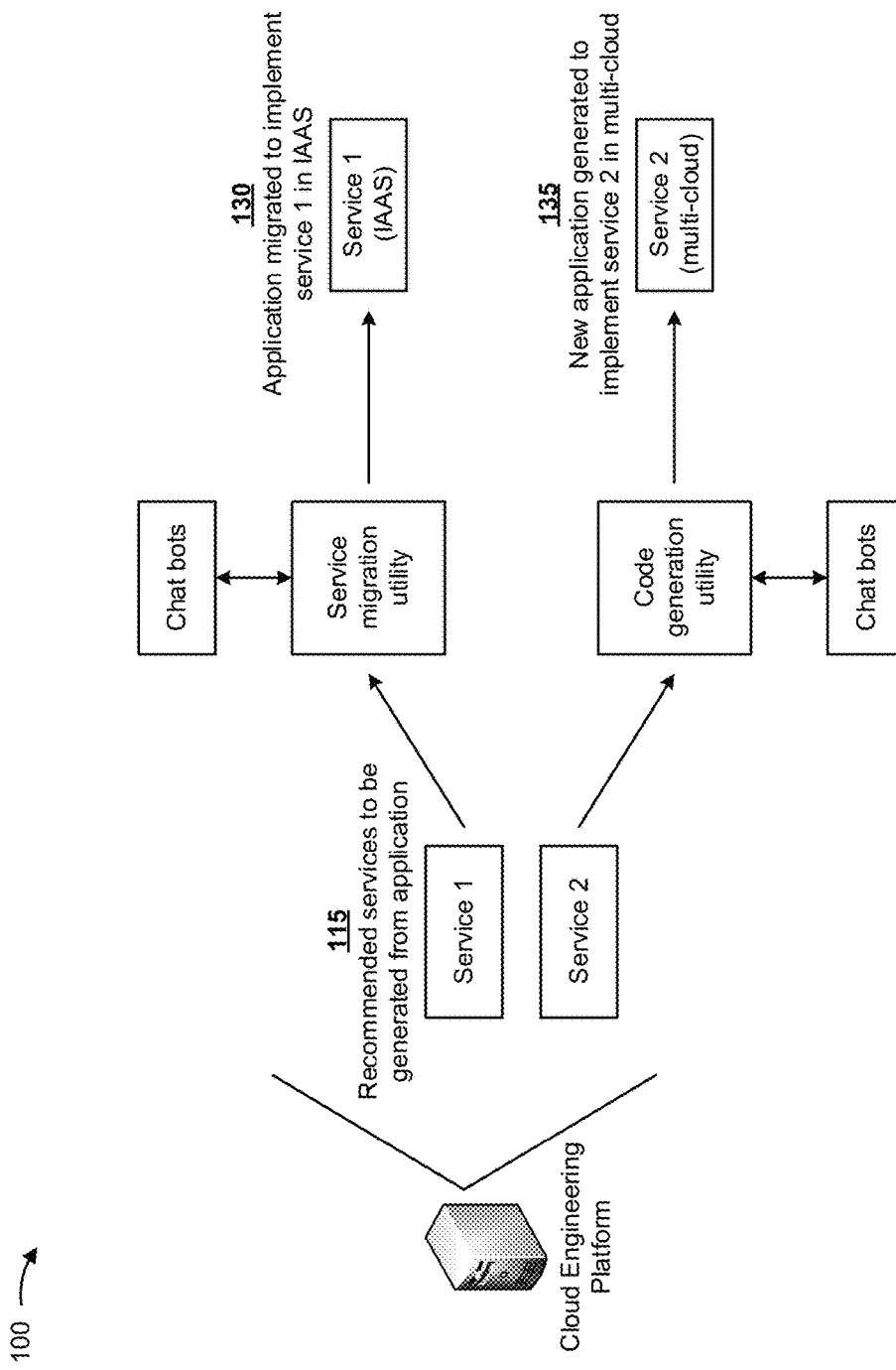

As shown in FIG. 1C, depending on the recommended service selected by the cloud engineering platform or the user, the cloud engineering platform may migrate the application to implement the recommended service or generate new code for the recommended service. For example, since the cloud engineering platform determined that the application need not be altered to implement Service 1, the cloud engineering platform may provide information associated with Service 1 to a service migration utility of the cloud engineering platform. In some implementations, the service migration utility may include a spring boot service migration utility, a spring cloud service migration utility, a node JavaScript (JS) service migration utility, a react.js code that is compiled with webpack, and/or the like. In some implementations, the service migration utility may automatically convert existing application code into services (e.g., using spring boot, spring cloud, node JS, HTML5/React.js, Spring Cloud Serverless, AWS Lambda, and/or a similar language). Some implementations described herein may be extensible to cover other languages. As shown by reference number 130, the service migration utility may migrate the application to implement Service 1 in IAAS. For example, the service migration utility may migrate the application by creating a web archive for the application, executing a conversion utility based on the web archive and a target location, and generating remediated run-anywhere code with support for service discovery and registration, distributed logging, and cloud implementation, based on executing the conversion utility.

In another example, since the cloud engineering platform determined that the application may not provide Service 2 and that Service 2 needs to be created, the cloud engineering platform may provide information associated with Service 2 to a code generation utility of the cloud engineering platform. In some implementations, the code generation utility may include a template-based code generation utility, a spring boot code generation utility, and/or the like. In some implementations, the code generation utility may automate code generation using reusable templates or scenario outlines, such as cucumber outlines and/or the like. In some implementations, the code generation utility may automate creation of a data access layer or system, such as a database management system, data sources, big data systems, and/or the like, for the services or microservices. As shown by reference number 135, the code generation utility may generate new code (e.g., a new application) to implement Service 2 in a multi-cloud platform.

As further shown in FIG. 1C, the service migration utility and the code generation utility may interact with one or more chat bots when migrating the application and generating the new code, respectively. In such implementations, the chat bots may provide mechanisms for user input to and interaction with the service migration utility and the code generation utility. For example, the chat bots may guide the process for migrating the application to implement Service 1 in IAAS, may guide the process for generating the new application to implement Service 2 in a multi-cloud platform, and/or the like. In some implementations, the cloud engineering platform may provide automated monitoring of the generated service (e.g., the migrated application or the generated new application). For example, the cloud engineering platform may perform tests on the generated service to determine whether the generated service is functioning properly.

Figure 1D:
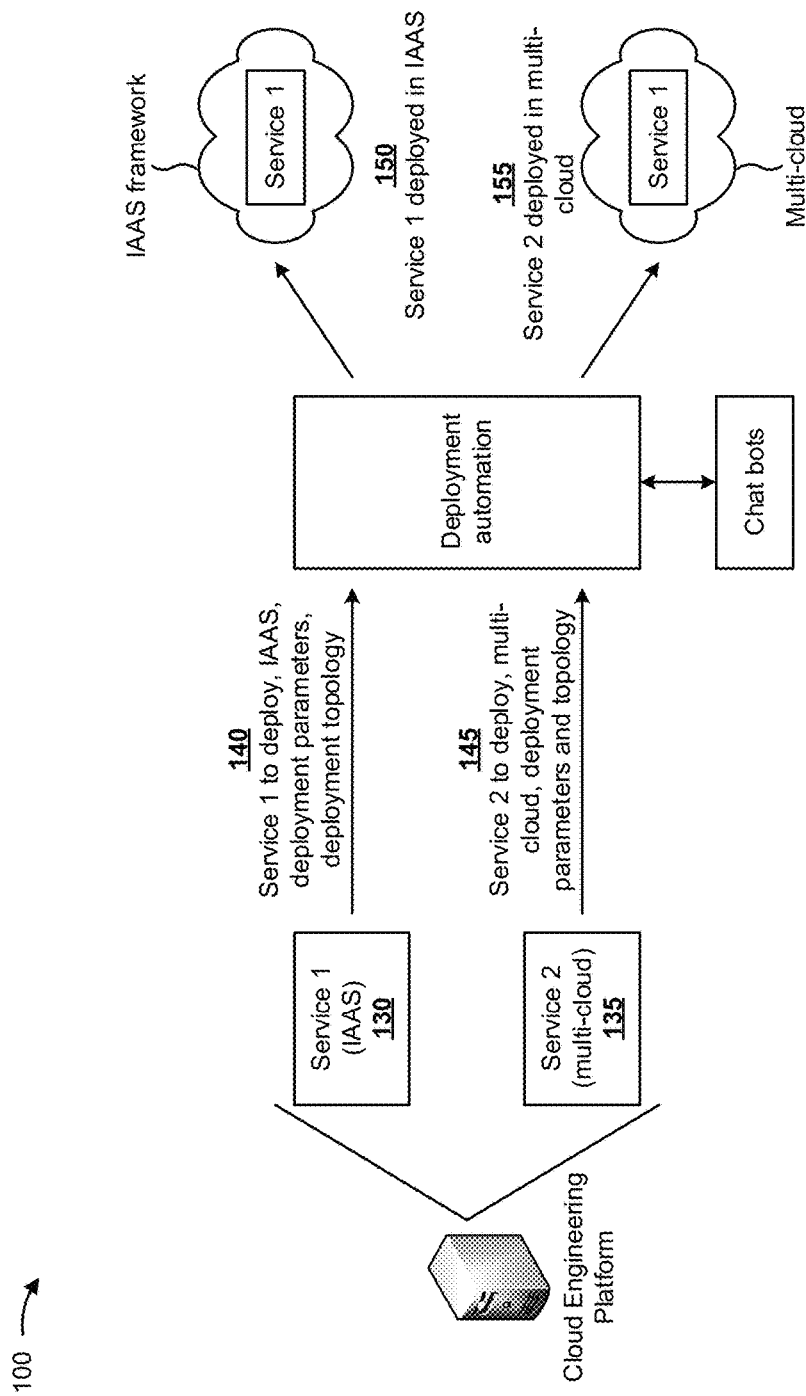

As shown in FIG. 1D, and by reference number 140, the cloud engineering platform may provide information associated with a service to deploy (e.g., Service 1), a deployment model (e.g., IAAS) for the service, deployment parameters for the service, a deployment topology for the service, and/or the like to a deployment automation mechanism of the cloud engineering platform. As further shown in FIG. 1D, and by reference number 145, the cloud engineering platform may provide information associated with a service to deploy (e.g., Service 2), a deployment model (e.g., Multi-cloud platform) for the service, deployment parameters for the service, a deployment topology for the service, and/or the like to the deployment automation mechanism.

In some implementations, the deployment parameters may include instructions to deploy the recommended services or microservices via corresponding deployment models. In some implementations, the deployment topologies may include always-on deployment topologies, single cloud deployment topologies, multi-cloud deployment topologies, blue-green deployment topologies, and/or the like, across a variety of cloud providers.

In some implementations, the deployment automation mechanism may automate development operations and containerization scripts for the recommended services on target platforms (e.g., service categories). For example, as shown by reference number 150, the deployment automation mechanism may deploy Service 1 (e.g., the migrated application) in an IAAS framework. In another example, as shown by reference number 155, the deployment automation mechanism may deploy Service 2 (e.g., the new application) in a multi-cloud platform. In some implementations, the deployment automation mechanism may include a Docker mechanism (e.g., a technology that uses containers for the creation, deployment, and/or execution of applications), a Salt mechanism (e.g., a Python-based open source configuration management software and remote execution engine), a Terraform mechanism (e.g., an infrastructure as code software), and/or the like. In some implementations, the cloud engineering platform may provide automated monitoring of deployed services. For example, the cloud engineering platform may perform tests on the deployed services to determine whether the deployed services are functioning properly. In some implementations, the cloud engineering platform may provide a secure environment (e.g., via encryption and/or the like) that manages and protects confidential information across containers, systems, environments, and/or the like when the services are deployed.

As further shown in FIG. 1D, the deployment automation mechanism may interact with one or more chat bots when deploying the recommended services. In such implementations, the chat bots may provide mechanisms for user input to and interaction with the deployment automation mechanism. For example, the chat bots may guide the process for deploying Service 1 in the IAAS or PAAS framework, may guide the process for deploying Service 2 in the multi-cloud platform, and/or the like. The deployments to IAAS and PAAS frameworks may be based on principles such as immutable infrastructure, immutable environments, service discovery, circuit breakers, and blue/green deployments for which the code and devops scripts are generated by the chat bots The deployment automation may provide chat bots that automate transfer of the application code, devops scripts, container-based scripts, build scripts, configuration files, etc. to a continuous deployment framework (e.g., Fabric8). Through this framework, features, such as a continuous deployment workflow, canary releases, AB testing and deployment to production may be implemented.

The architecture that is created by the chat bots may include security features, such as creation of scripts for automated provision of vaults for storing secrets, firewall rules and surface area reduction through ingress methods such as reverse proxy farms. Scripts for provisioning these may be automatically generated by the chat bots.

Figure 1E:
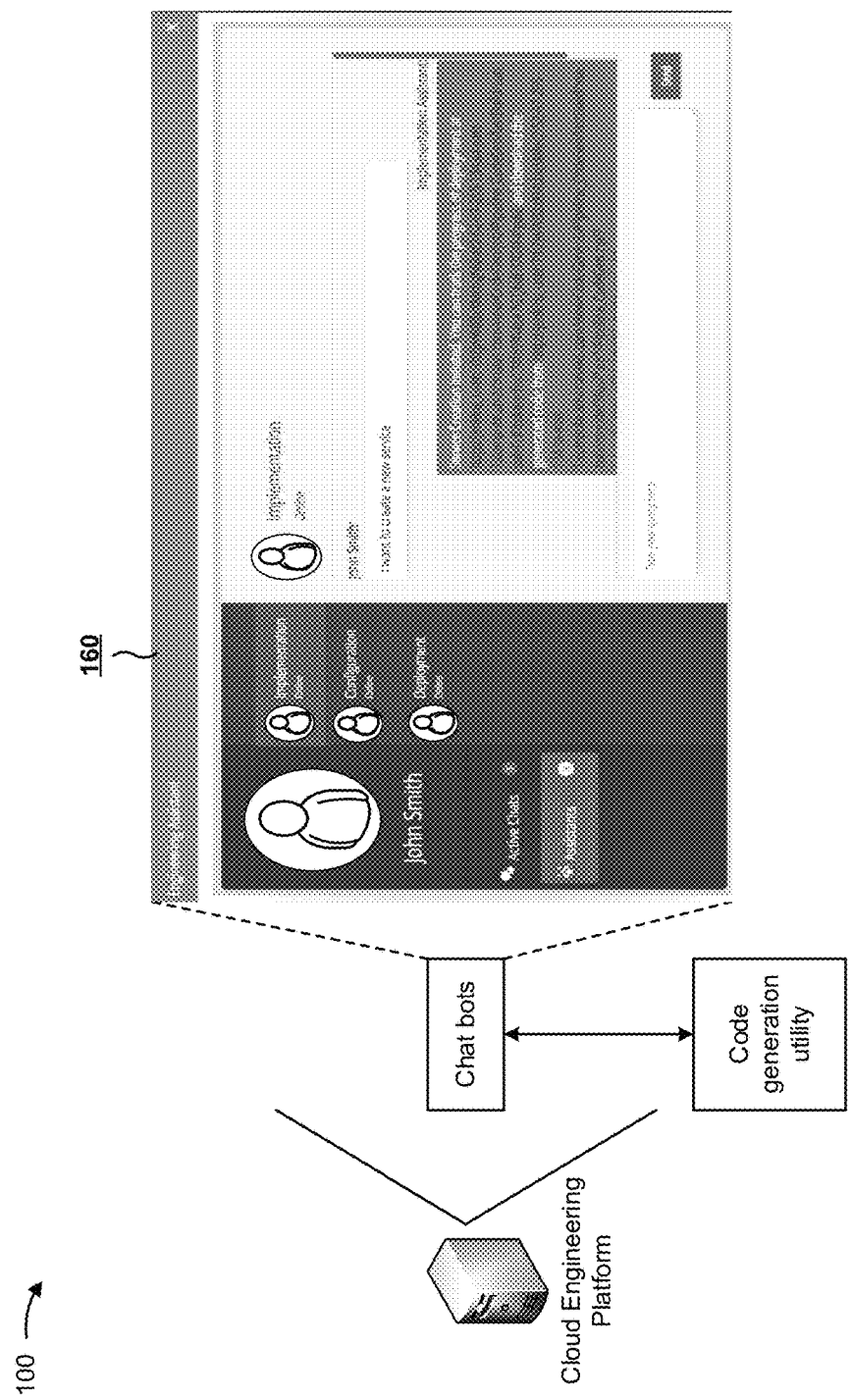

As shown in FIG. 1E, and by reference number 160, the cloud engineering platform may utilize a chat bot to provide a user interface that aids in generating new code (e.g., a new application) to create a new service based on the application. For example, a user of the cloud engineering platform may utilize the user interface to indicate that the user wishes to create a new service based on the application. The user interface may provide an assistant for creating the new service, for creating new code based on the application, and/or the like. In some implementations, the user may chat with the chat bot and provide inputs needed for service generation based on the application. Once the user triggers the service generation using the chat bot, the service may be created and the user may be provided an address (e.g., a uniform resource locator, URL) where the user may verify logs and download source code of the generated service.

Figure 1F:
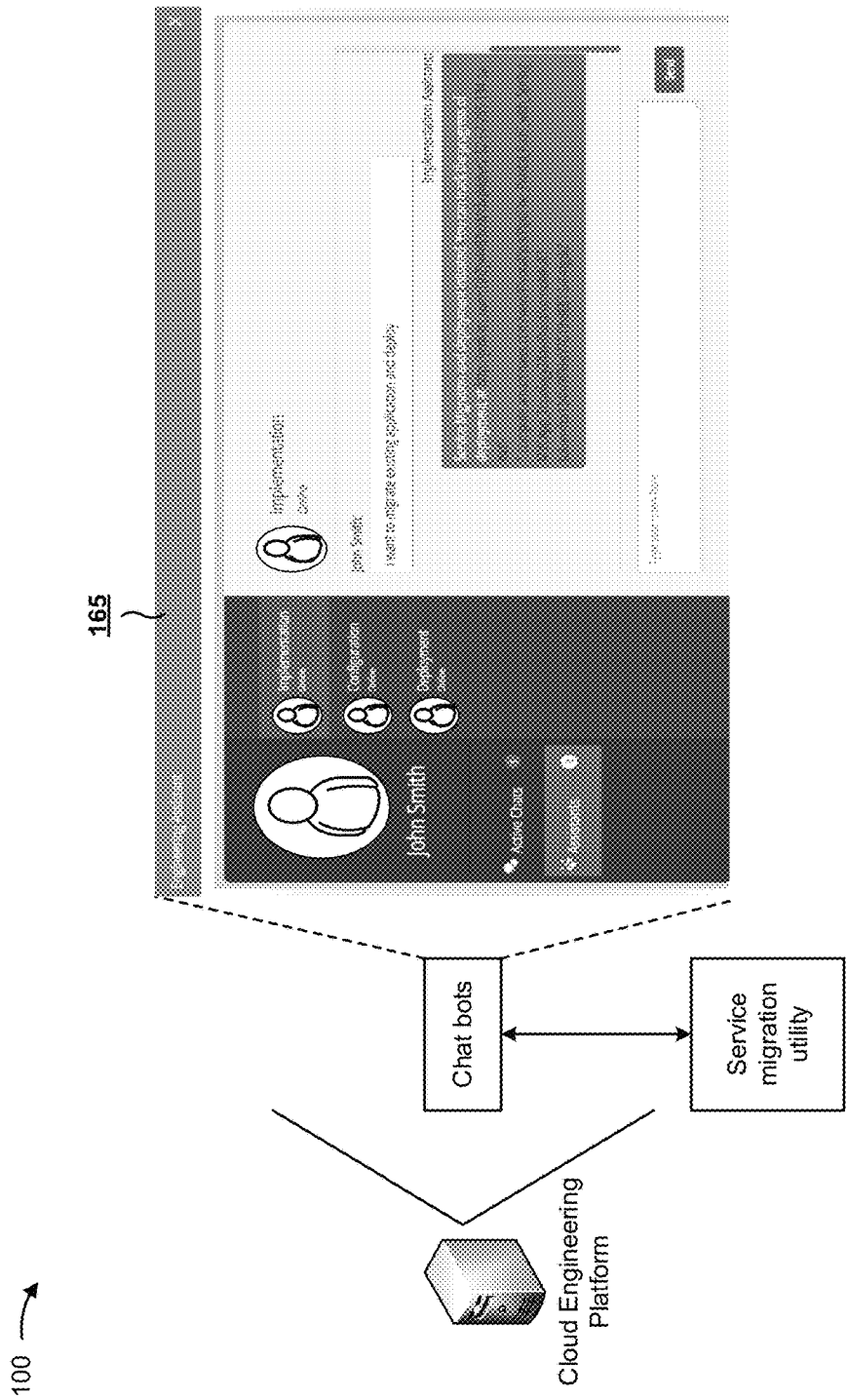

As shown in FIG. 1F, and by reference number 165, the cloud engineering platform may utilize a chat bot to provide a user interface that aids in migrating the application to provide a new service. For example, a user of the cloud engineering platform may utilize the user interface to indicate that the user wishes to migrate the application to create the new service. The user interface may provide an assistant for converting the existing code of the application, for migrating the converted code to a target platform, and/or the like. In some implementations, the user may chat with the chat bot and provide inputs needed for application migration. Once the user triggers the application migration using the chat bot, the application may be migrated and the user may be provided an address (e.g., a URL) where the user may verify logs and download source code of the migrated application.

Figure 1G:
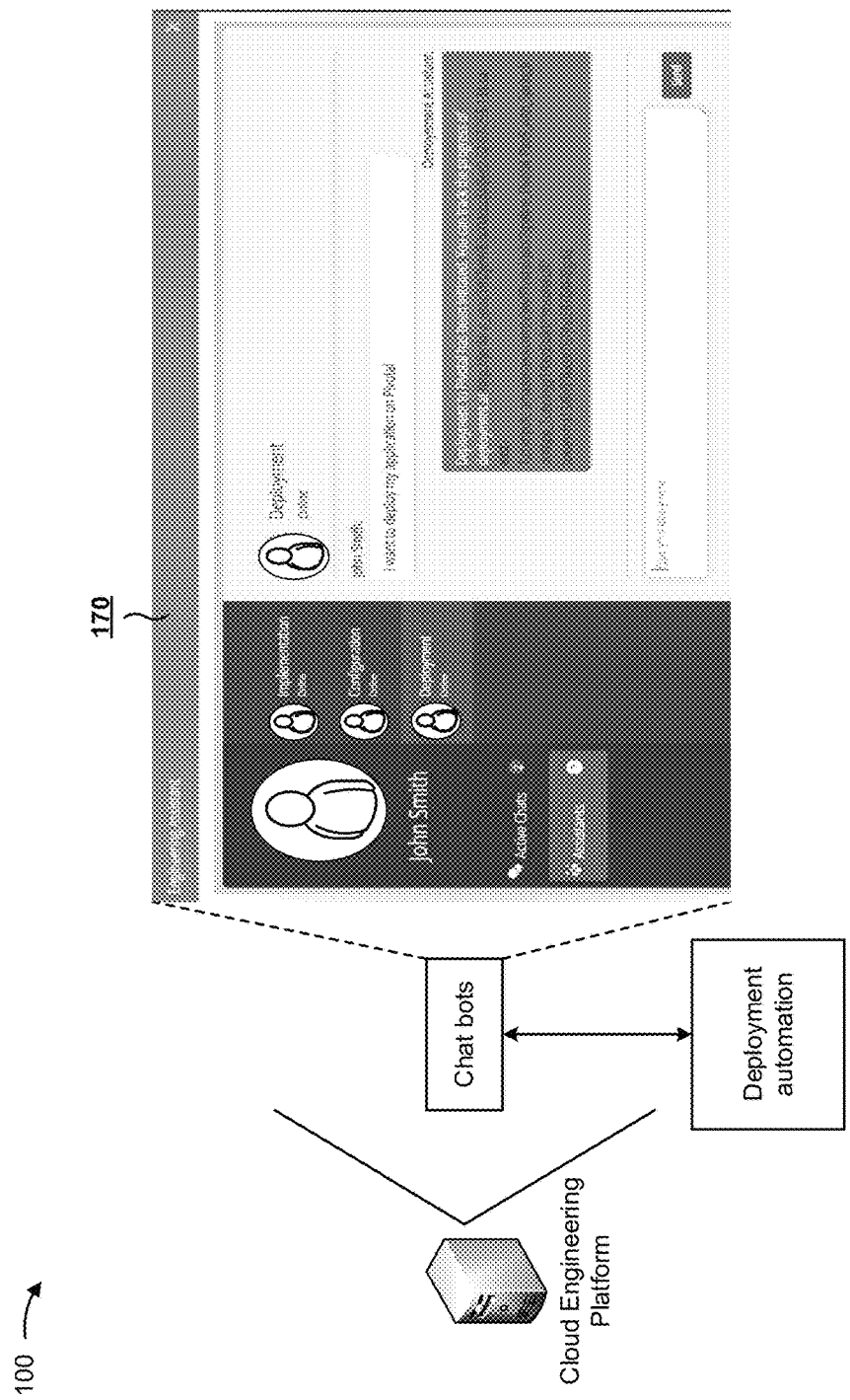

As shown in FIG. 1G, and by reference number 170, the cloud engineering platform may utilize a chat bot to provide a user interface that aids in deploying a new service that is created based on the application. For example, a user of the cloud engineering platform may utilize the user interface to indicate that the user wishes to deploy the new service. The user interface may provide an assistant for deploying the migrated application, for deploying the new service, and/or the like. In some implementations, the user may chat with the chat bot and provide inputs needed for deployment of the migrated application or the new service. Once the user triggers the deployment using the chat bot, the migrated application or the new service may be deployed and the user may be provided an address (e.g., a URL) where user may verify deployment logs and launch the migrated application or the new service.

In this way, several different stages of the application design or modernization process are automated using AI, which may remove human subjectivity and waste from the process, and which may improve speed and efficiency of the process and conserve computing resources (e.g., processors, memory, and/or the like). Furthermore, implementations described herein use a rigorous, computerized process to perform tasks or roles that were previously performed using subjective human intuition or input. These roles may include identification and prioritization of business and technological imperatives, identification of services or microservices that may be modernized or that should be built from scratch, code conversion for creation of services or microservices, data access layer creation for services or microservices, selection of deployment environments or deployment models, security processes or procedures, and/or management of deployment across multiple different cloud providers. Furthermore, by automating the service creation and deployment process, performance of the services and/or the process that was previously performed by a monolithic application is improved.

As indicated above, FIGS. 1A-1G are provided merely as examples. Other examples are possible and may differ from what was described with regard to FIGS. 1A-1G.

Figure 2:
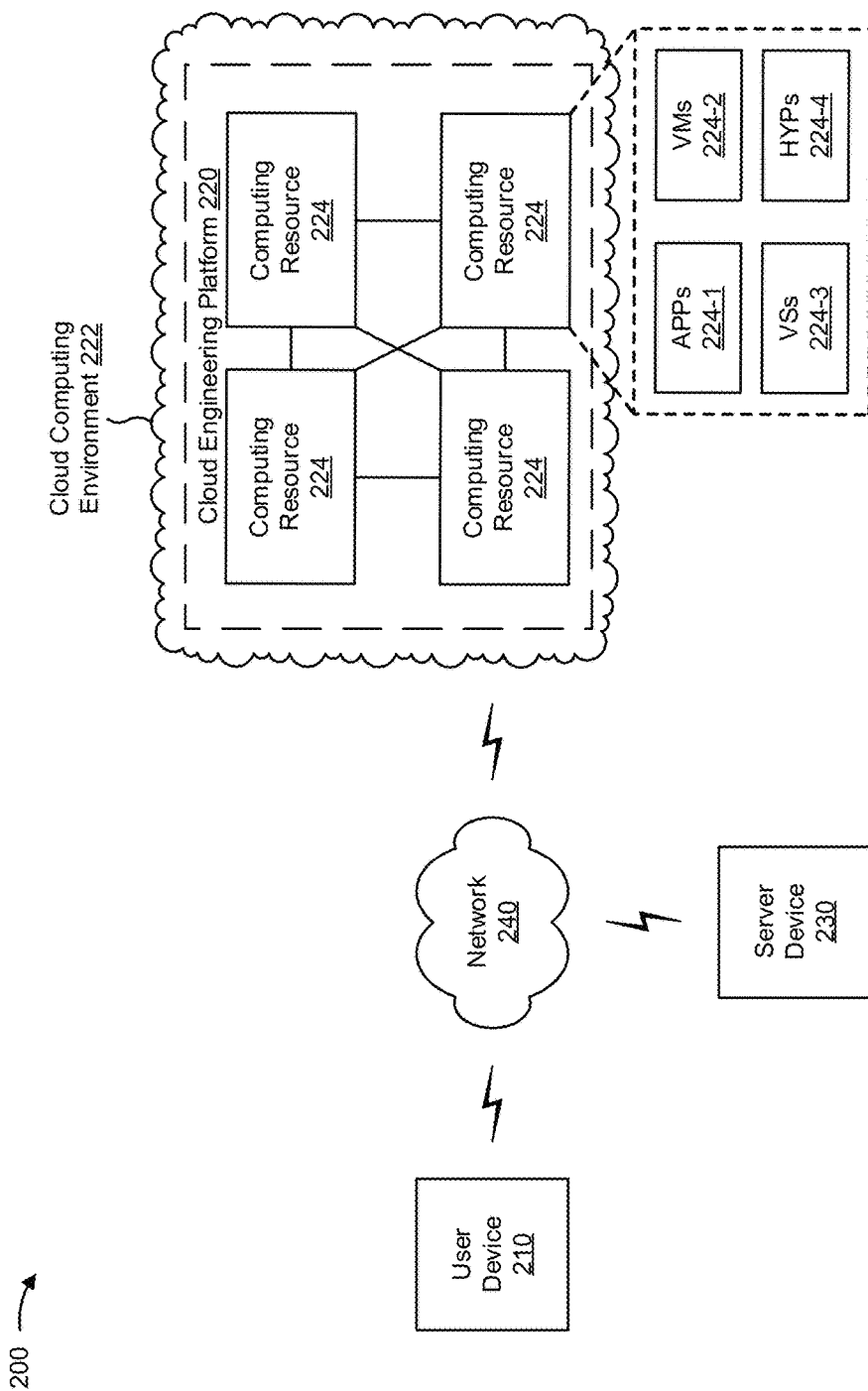
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a cloud engineering platform 220, a server device 230, and a network 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to cloud engineering platform 220 and/or server device 230.

Cloud engineering platform 220 includes one or more devices that identify services or microservices based on a monolithic application, generate code for the services or microservices, and deploy the generated code so that the monolithic application is implemented via the services or microservices. In some implementations, cloud engineering platform 220 may be designed to be modular such that certain software components may be swapped in or out depending on a particular need. As such, cloud engineering platform 220 may be easily and/or quickly reconfigured for different uses. In some implementations, cloud engineering platform 220 may receive information from and/or transmit information to one or more user devices 210 and/or server devices 230.

In some implementations, as shown, cloud engineering platform 220 may be hosted in a cloud computing environment 222. Notably, while implementations described herein describe cloud engineering platform 220 as being hosted in cloud computing environment 222, in some implementations, cloud engineering platform 220 may not be cloud-based (i.e., may be implemented outside of a cloud computing environment) or may be partially cloud-based.

Cloud computing environment 222 includes an environment that hosts cloud engineering platform 220. Cloud computing environment 222 may provide computation, software, data access, storage, etc. services that do not require end-user knowledge of a physical location and configuration of system(s) and/or device(s) that hosts cloud engineering platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host cloud engineering platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210 and/or server device 230. Application 224-1 may eliminate a need to install and execute the software applications on user device 210 and/or server device 230. For example, application 224-1 may include software associated with cloud engineering platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., server device 230 or an operator of cloud engineering platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Server device 230 includes a device that is capable of communicating with one or more other devices included in environment 200. For example, server device 230 may include a computing device, such as a server, a desktop computer, a laptop computer, a tablet computer, a handheld computer, or a similar device. In some implementations, server device 230 may receive information from and/or transmit information to user device 210 and/or cloud engineering platform 220.

Network 240 includes one or more wired and/or wireless networks. For example, network 240 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
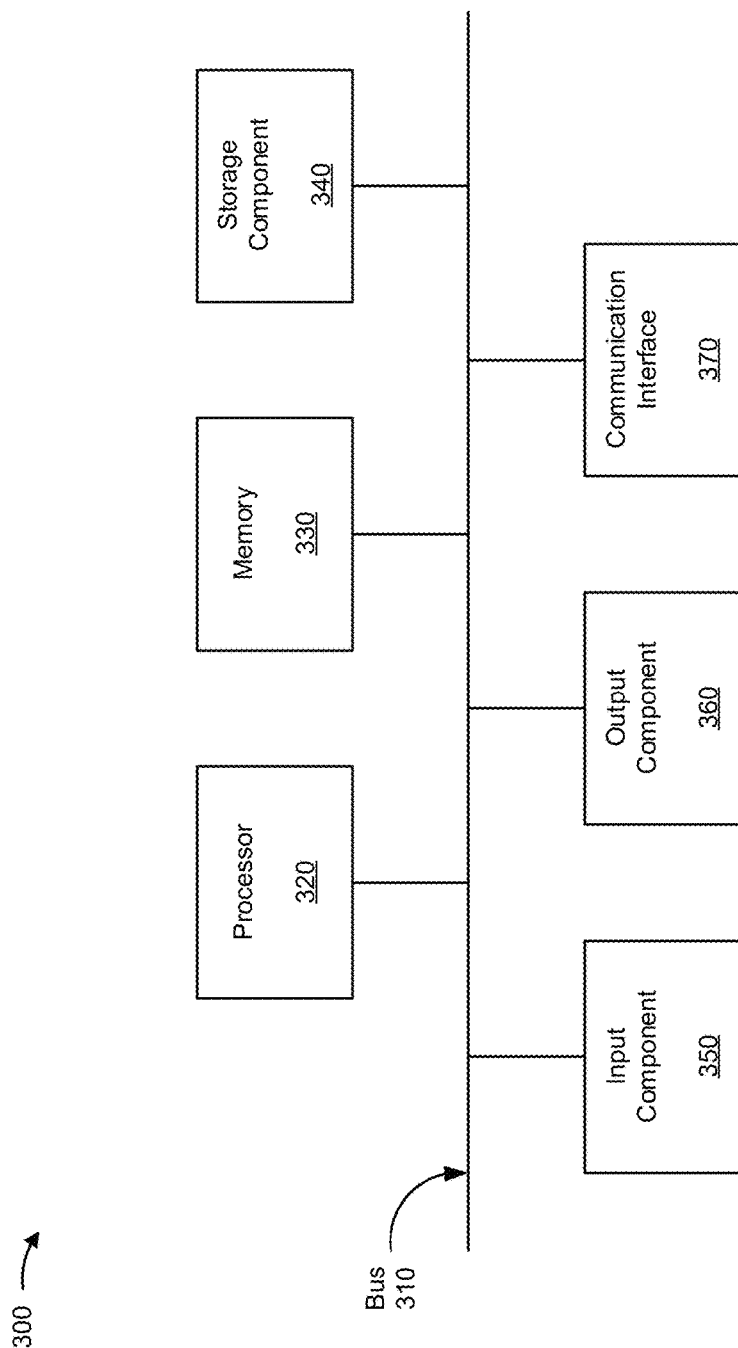
FIG. 3 is a diagram of example components of one or more devices of FIG. 2.

FIG. 3 is a diagram of example components of a device 300. Device 300 may correspond to user device 210, cloud engineering platform 220, computing resource 224, and/or server device 230. In some implementations, user device 210, cloud engineering platform 220, computing resource 224, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
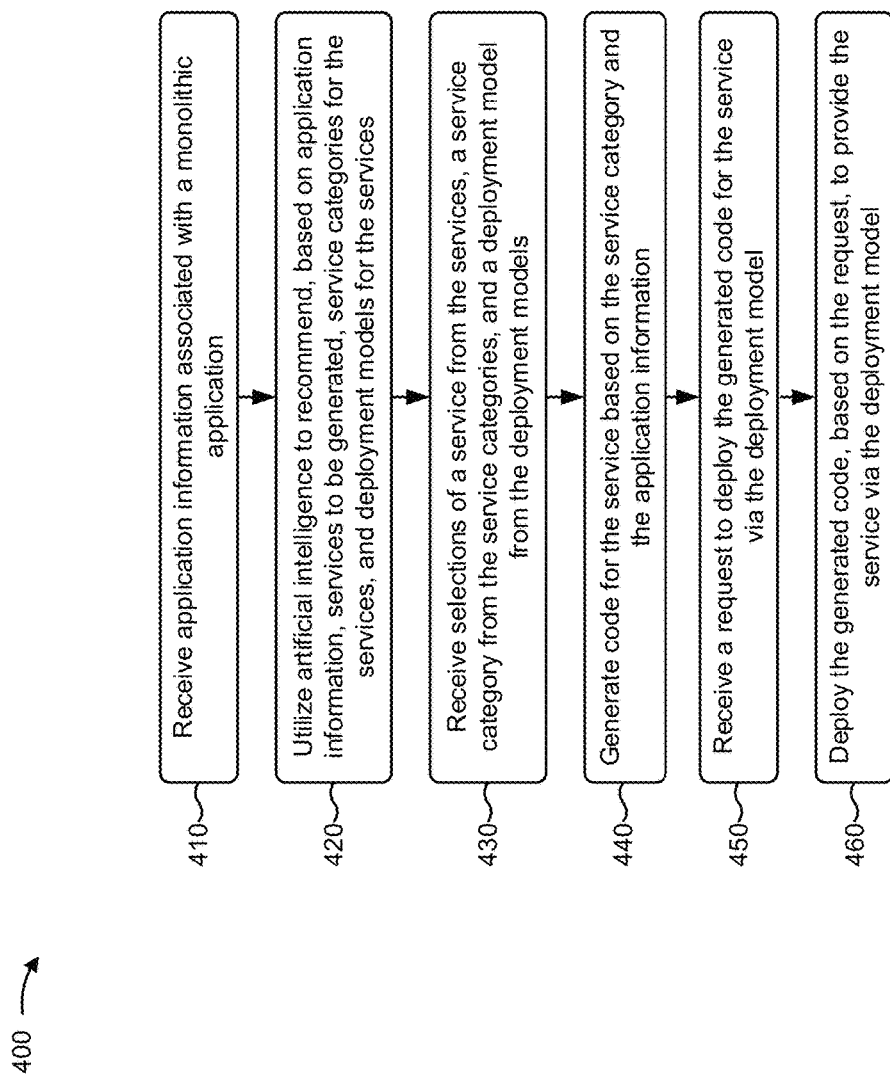
FIG. 4 is a flow chart of an example process for generating one or more services based on a monolithic application.

FIG. 4 is a flow chart of an example process 400 for generating one or more services based on a monolithic application. In some implementations, one or more process blocks of FIG. 4 may be performed by cloud engineering platform 220. In some implementations, one or more process blocks of FIG. 4 may be performed by another device or a group of devices separate from or including cloud engineering platform 220, such as user device 210 and/or server device 230.

As shown in FIG. 4, process 400 may include receiving application information associated with a monolithic application (block 410). For example, cloud engineering platform 220 may receive application information associated with a monolithic application. In some implementations, server device 230 may be associated with a monolithic application. User device 210 and/or server device 230 may provide the application information to cloud engineering platform 220, and cloud engineering platform 220 may receive the application information from user device 210 and/or server device 230. In some implementations, the application information may include code of the application, information about technical parameters of the application, business parameters of the application, business imperatives and/or technology imperatives associated with the application, a software license agreement of the application, availability information associated with the application, operational needs of the application, and/or the like.

As further shown in FIG. 4, process 400 may include utilizing artificial intelligence to recommend, based on the application information, services to be generated, service categories for the services, and deployment models for the services (block 420). For example, cloud engineering platform 220 may utilize artificial intelligence to recommend, based on the application information, services to be generated, service categories for the services, and deployment models for the services. In some implementations, cloud engineering platform 220 may provide the application information to an AI model, and the AI model may identify, based on the application information, recommended services (or microservices) to be generated from the application.

In some implementations, the AI model may identify a service category for each of the recommended services (or microservices). In some implementations, the service category may include a "leave as is" category (e.g., indicating that the application need not be altered to implement a recommended service), a "build new" category (e.g., indicating that the application may not provide a recommended service, and that the recommended service needs to be created), a "modernize" category (e.g., indicating that the application needs to be modernized in order to implement a recommended service), and/or the like. In some implementations, the AI model may identify a deployment model best suited for each of the recommended services (or microservices). In some implementations, the deployment model may include IAAS on a web service, IAAS on a cloud application platform, PAAS on a cloud application platform, a multi-cloud platform deployment, and/or the like.

As further shown in FIG. 4, process 400 may include receiving selections of a service from the services, a service category from the service categories, and a deployment model from the deployment models (block 430). For example, cloud engineering platform 220 may receive selections of a service from the services, a service category from the service categories, and a deployment model from the deployment models. In some implementations, cloud engineering platform 220 may receive selections of the service and the deployment model, but not the service category. In some implementations, cloud engineering platform 220 may receive a selection of the service prior to receiving a selection of the deployment model.

In some implementations, cloud engineering platform 220 may receive selections of the service, the service category, and/or the deployment model from a user of cloud engineering platform 220. In some implementations, cloud engineering platform 220 may automatically select the service, the service category, and/or the deployment mode without user interaction with cloud engineering platform 220.

As further shown in FIG. 4, process 400 may include generating code for the service based on the service category and the application information (block 440). For example, cloud engineering platform 220 may generate code for the service based on the service category and the application information. In some implementations, if the service category indicates that the application need not be altered to implement the service, cloud engineering platform 220 may provide information associated the service to a service migration utility of cloud engineering platform 220. In some implementations, the service migration utility may automatically convert existing application code into the service (e.g., using spring boot, spring cloud, node JS, and/or a similar language).

In some implementations, if the service category indicates that the application may not provide the service and that the service needs to be created, cloud engineering platform 220 may provide information associated with the service to a code generation utility of cloud engineering platform 220. In some implementations, the code generation utility may automate code generation using reusable templates or scenario outlines, such as cucumber outlines and/or the like. In some implementations, the code generation utility may generate new code (e.g., a new application) to implement the service.

As further shown in FIG. 4, process 400 may include receiving a request to deploy the generated code for the service via the deployment model (block 450). For example, cloud engineering platform 220 may receive a request to deploy the generated code for the service via the deployment model. In some implementations, cloud engineering platform 220 may receive the request to deploy the generated code from a user of cloud engineering platform 220. In some implementations, cloud engineering platform 220 may automatically deploy the generated code, once the code is generated and without user interaction with cloud engineering platform 220.

As further shown in FIG. 4, process 400 may include deploying the generated code, based on the request, to provide the service via the deployment model (block 460). For example, cloud engineering platform 220 may deploy the generated code, based on the request, to provide the service via the deployment model. In some implementations, cloud engineering platform 220 may provide information associated with the service to deploy, the deployment model for the service, deployment parameters for the service, a deployment topology for the service, and/or the like to a deployment automation mechanism of cloud engineering platform 220. In some implementations, the deployment parameters may include instructions to deploy the service via the deployment model, and the deployment topologies may include always-on deployment topologies, single cloud deployment topologies, multi-cloud deployment topologies, blue-green deployment topologies, and/or the like, across a variety of cloud providers. In some implementations, the deployment automation mechanism may deploy the service via the deployment model.

In some implementations, cloud engineering platform 220 may deploy the generated code in one or more devices remote from cloud engineering platform 220, and the one or more device may provide the service based on the deployment of the generated code. In some implementations, cloud engineering platform 220 may deploy the generated code within cloud engineering platform 220. In such implementations, cloud engineering platform 220 may select one or more VMs (e.g., within cloud computing environment 222) that are capable of executing the generated code, that can provide the service, and/or the like. Cloud engineering platform 220 may deploy the generated code in the one or more VMs, and the one or more VMs may provide the service based on the deployment of the generated code.

In some implementations, once the generated code is deployed, the service may be accessed by one or more users so that functionality of the service may be available to the one or more users. For example, the service may include, but are not limited to, a software-defined infrastructure service, a deployment management service, a security management service, a business service, a web service, a financial service, an accounting service, a mobile service, a manufacturing service, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a seamless and interactive way to identify and create future-ready services from traditional monolithic applications. For example, some implementations described herein may utilize AI to identify a monolithic application amenable to being modernized (e.g., updated or built from scratch) through integration of services or microservices based on business imperatives and/or technology imperatives associated with the application and/or based on an entity associated with the application. Additionally, or alternatively, some implementations described herein may generate code for the services or microservices, and may deploy the generated code so that the monolithic application is implemented via the services or microservices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive application information associated with a monolithic application;
generate a recommendation based on utilizing an artificial intelligence technique:
the recommendation relating to:
a service to be generated that is identified by the artificial intelligence technique,
a service category, for the service, that is identified by the artificial intelligence technique from among a plurality of service categories,
the plurality of service categories including a first category that indicates the monolithic application need not be altered to implement the service and a second category that indicates the service needs to be created, and
a deployment model, for the service, that is identified by the artificial intelligence technique from among a plurality of deployment models that may be used for the service,
the artificial intelligence technique generating the recommendation based on the application information;
automatically generate code for the service based on the service category and the application information,
where, when automatically generating the code, the one or more processors are to:
determine that the service cannot be generated from the monolithic application based on the service category being identified as the second category that indicates the service needs to be created; and
automatically generate the code, without reference to the monolithic application, using reusable templates or scenario outlines, and based on determining that the service category is the second category that indicates the service needs to be created;
receive a request to deploy the generated code for the service via the deployment model; and
deploy the generated code, based on the request, to provide the service via the deployment model.

2. The device of claim 1, where the one or more processors are further to:
determine that another service is to be migrated via the deployment model; and
automatically convert the other service to code for the other service based on determining that the other service is to be migrated via the deployment model.

3. The device of claim 1, where the one or more processors are further to:
provide, to another device associated with the application information, a particular format for the application information; and
receive the application information in the particular format from the other device.

4. The device of claim 1, where the service includes one or more microservices.

5. The device of claim 1, where the deployment model includes one or more of:
information as a service (IAAS) on a web service,
IAAS on a cloud application platform,
platform as a service (PAAS) on a cloud application platform, or
a multi-cloud platform deployment.

6. The device of claim 1, where the one or more processors are further to:

provide one or more chat bots to assist in automatically generating the code or deploying the generated code.

7. The device of claim 1, where a cucumber outline is used to automatically generate the code.

8. A non-transitory computer-readable medium storing instructions, the instructions comprising:
one or more instructions that, when executed by one or more processors, cause the one or more processors to:
receive application information associated with a monolithic application;
generate a recommendation based on utilizing an artificial intelligence technique:
the recommendation relating to:
a service to be generated that is identified by the artificial intelligence technique,
a service category, for the service, that is identified by the artificial intelligence technique from among a plurality of service categories,
the plurality of service categories including a first category that indicates the monolithic application need not be altered to implement the service and a second category that indicates the service needs to be created, and
a deployment model, for the service, that is identified by the artificial intelligence technique from among a plurality of deployment models that may be used for the service,
the artificial intelligence technique generating the recommendation based on the application information;
automatically generate code for the service based on the service category and the application information,
where the one or more instructions that cause the one or more processors to automatically generate the code, further cause the one or more processors to:
determine that the service cannot be generated from the monolithic application based on the service category being identified as the second category that indicates the service needs to be created; and
automatically generate the code, without reference to the monolithic application, using reusable templates or scenario outlines, and based on determining that the service category is the second category that indicates the service needs to be created;
receive a request to deploy the generated code for the service via the deployment model; and
deploy the generated code, based on the request, to provide the service via the deployment model.

9. The non-transitory computer-readable medium of claim 8, where the one or more instructions further cause the one or more processors to:
determine that another service is to be migrated via the deployment model; and
automatically convert the other service to code for the other service based on determining that the other service is to be migrated via the deployment model.

10. The non-transitory computer-readable medium of claim 8, where the instructions further comprise:
one or more instructions that, when executed by the one or more processors, cause the one or more processors to:
provide, to a device associated with the application information, a particular format for the application information; and
receive the application information in the particular format from the device.

11. The non-transitory computer-readable medium of claim 8, where the service includes one or more microservices.

12. The non-transitory computer-readable medium of claim 8, where the deployment model includes one or more of:
information as a service (IAAS) on a web service,
IAAS on a cloud application platform,
platform as a service (PAAS) on a cloud application platform, or
a multi-cloud platform deployment.

13. The non-transitory computer-readable medium of claim 8, where the instructions further comprise:
one or more instructions that, when executed by the one or more processors, cause the one or more processors to:
provide one or more chat bots; and
receive, via the one or more chat bots, information to assist in deploying the generated code; and
where the one or more instructions, that cause the one or more processors to deploy the generated code, cause the one or more processors to:
deploy the generated code based on the information to assist in deploying the generated code.

14. The non-transitory computer-readable medium of claim 8, where a cucumber outline is used to automatically generate the code.

15. A method, comprising:
receiving, by a device, application information associated with a monolithic application;
generating, by the device, a recommendation based on utilizing an artificial intelligence technique:
the recommendation relating to:
a service to be generated that is identified by the artificial intelligence technique,
a service category, for the service, that is identified by the artificial intelligence technique from among a plurality of service categories,
the plurality of service categories including a first category that indicates the monolithic application need not be altered to implement the service and a second category that indicates the service needs to be created, and
a deployment model, for the service, that is identified by the artificial intelligence technique from among a plurality of deployment models that may be used for the service,
the artificial intelligence technique generating the recommendation based on the application information;
automatically generating, by the device, code for the service based on the service category and the application information,
where automatically generating the code includes:
determining that the service cannot be generated from the monolithic application based on the service category being identified as the second category that indicates the service needs to be created; and
automatically generating the code, without reference to the monolithic application, using reusable templates or scenario outlines, and based on determining that the service category is the second category that indicates the service needs to be created;

receiving, by the device, a request to deploy the generated code for the service via the deployment model; and deploying, by the device and based on the request, the generated code to provide the service via the deployment model.

16. The method of claim 15, further comprising:

determining that another service is to be migrated via the deployment model; and automatically converting the other service to code for the other service based on determining that the other service is to be migrated via the deployment model.

17. The method of claim 15, further comprising:

providing, to another device associated with the application information, a particular format for the application information; and receiving the application information in the particular format from the other device.

18. The method of claim 15, where the deployment model includes one or more of:

information as a service (IAAS) on a web service,

IAAS on a cloud application platform, platform as a service (PAAS) on a cloud application platform, or a multi-cloud platform deployment.

19. The method of claim 15, further comprising:

providing one or more chat bots to assist in automatically generating the code or deploying the generated code.

20. The method of claim 15, where a cucumber outline is used to automatically generate the code.

* * * * *